(No Model.)

H. E. DECKEBACH.
APPARATUS FOR COOLING AND AERATING MALT LIQUORS.

No. 474,630. Patented May 10, 1892.

Witnesses
Frank S. Davis
David S. Oliver

Inventor
Henry E. Deckebach
By his Attorney Geo. J. Murray

UNITED STATES PATENT OFFICE.

HENRY E. DECKEBACH, OF CINCINNATI, OHIO.

APPARATUS FOR COOLING AND AERATING MALT LIQUORS.

SPECIFICATION forming part of Letters Patent No. 474,630, dated May 10, 1892.

Application filed October 9, 1891. Serial No. 408,221. (No model.)

*To all whom it may concern:*

Be it known that I, HENRY E. DECKEBACH, a citizen of the United States, and a resident of Cincinnati, in the county of Hamilton and State of Ohio, have invented certain new and useful Improvements in Apparatus for Cooling and Aerating Malt Liquors, of which the following is a specification.

My invention is an improved means to cool the wort or infusion of malt and hops after it leaves the boiler preparatory to passing it to the fermenting-tuns. There are appliances in use for forcing the wort under pressure through spraying-nozzles arranged some distance above the "boat," causing it to descend in a fine spray through the air in the cooling-room. I have found by experiment that the liquor treated in this manner has not the fine flavor of the beer treated by the old process by which it was allowed to trickle in thin sheets or streams over cooling-surfaces or through pipes immersed in a cooling-liquid; but the older process is more expensive than that by which the wort is sprayed through the air of the cooling-room. It is also well understood that the wort should be quickly cooled after it leaves the boiler in order to prevent acidity or "foxing."

The object of my invention is to rapidly cool the wort without subjecting it to pressure and to properly aerate it without dissipating the volatile oil of the hops, which imparts the delicate flavor to the beer or other malt liquor, as it is believed is done by breaking it up into fine spray, either by forcing it through spraying-nozzles or allowing it to fall any considerable distance in thin streams. These objects I accomplish by the means shown in the accompanying drawings, in connection with which the invention will be first fully described, and then particularly referred to and pointed out in the claims.

Figure 1:
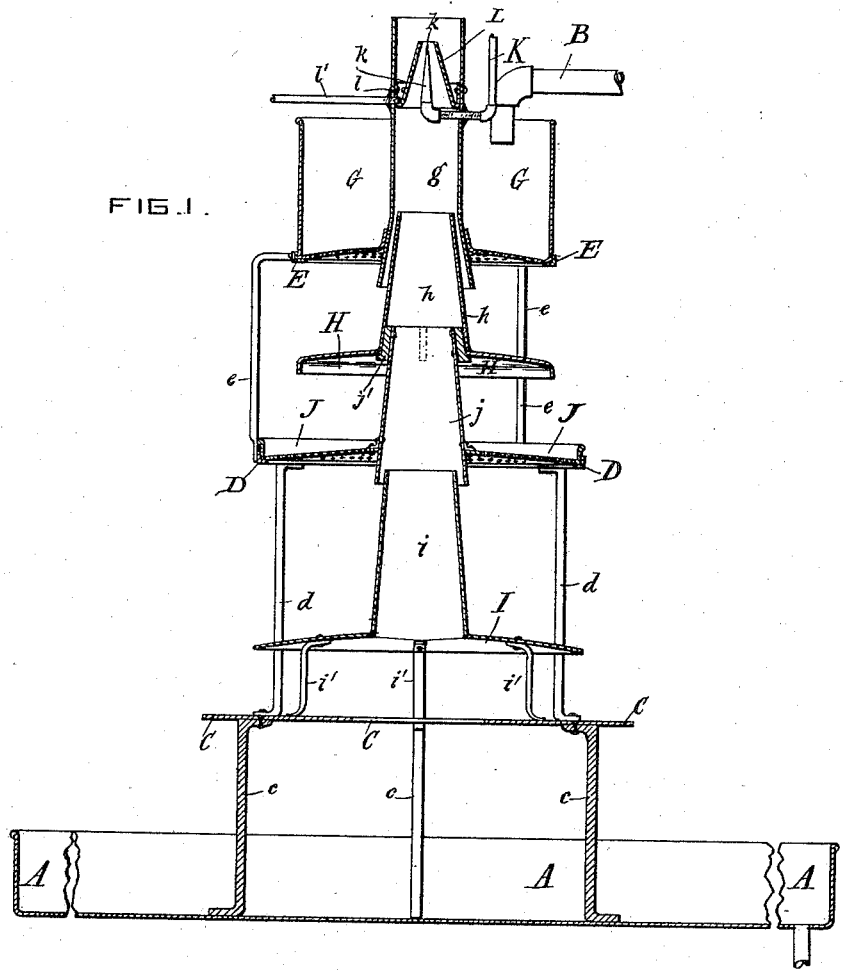
Figure 2:
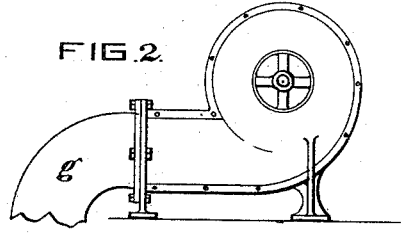

Figure 1 is a vertical diametrical section of an apparatus embodying my invention. Fig. 2 is a detail view of the vapor-discharge pipe provided with an exhaust fan or ventilator.

Referring to the parts, A is the customary cooling vessel or boat, and B a pipe leading from the boiler, the discharge end of which in this case is much elevated to admit of my cooler being placed between it and the boat. The frame or stand which supports the movable parts consists of the centrally-perforated disk C, the legs *c*, riveted to it, which have outwardly-returned feet to rest upon bottom of boat A, the flanged rings D E, which are supported above one another and the disk C, and the rods *d e*. The rods *d* have their lower ends outwardly bent to receive rivets which secure them upon the disk C, and flattened upper ends which receive rivets passing through them and the upturned flange of the ring D. The rods *e* are secured to the ring D by rivets passing through their lower flattened ends and support the ring E by rivets passing through their ends, which are bent inwardly and have their flattened upper ends bent at angle to the inward bend to bear against the flange of the upper ring E.

The removable parts, which are supported upon the stand or frame, consist of receiving-vessel G, the two concavo-convex deflector-disks I H, the pan J intermediate the deflectors, and their attachments. Each of these parts I will now describe separately and in their position relative to the parts with which they coact to produce the result attained by my invention.

The concavo-convex disk I is centrally perforated and provided with a cone-shaped pipe or tube *i*, which terminates a short distance below the bottom of the pan J. It is also provided with supporting-feet *i'*, the upper ends of which are secured to the disk and the lower ends or feet of which rest upon the disk C. The pan J, which is supported in the flanged ring D, has a concavo-convex bottom, which is centrally perforated and provided with a cone-shaped pipe or tube *j*, the lower end of which extends below the pan and overhangs the upper end of pipe *i*. The upper end of this pipe *j* extends into the flaring lower end of a tube *h*, which is secured centrally in the deflector H. The tube *j* has four bearings *j'*, soldered or otherwise secured upon its upper end, to support the deflector H and its pipe *h* away from the tube *j*, so that a free space is left between the upper end of the pipe *j* and the lower end of pipe *h* for the passage of the vapors from the passing wort. The deflector H has its perimeter turned downwardly to form a flange, over which the wort passes in a thin sheet. The receiving-vessel G rests in the flanged ring E. Its bottom is concavo-convex and centrally provided with a tube $g$, which extends below the bottom and above the top of the vessel to connect with a pipe leading to the outside of the building. The tube $h$ extends up into the lower flaring end of the pipe $g$. The bottom of the vessel G, like the pan J, is perforated with small openings from the central tube to near its rim. The purpose of inclining the bottom of the vessels G and pan J upward is to prevent the clogging of the small holes by portions of the hops or other sediment which may be carried with the wort from the boiler. These will be washed into the trough formed by the non-perforated portion of the bottom and the surrounding rim. The vessel G and pan J are made removable for the purpose of cleansing them.

It will be seen from the foregoing that the wort which is delivered from the boiler through pipe B to the receiving-vessel G will trickle in thin streams on the deflector H, from which it will be delivered in a thin stream or sheet into the pan J, from which it is again delivered in small streams upon the deflector I, falling therefrom in a thin sheet onto the flat disk C, from which it flows over its perimeter and through its central opening into the boat A. From the boat it is carried through the pipe $a$ to the fermenting-tun or to the pipes cooled by the refrigerator or ice-machine, which may be interposed between the boat and the fermenting-tuns. The wort leaves the boiler at a temperature of 200° Fahrenheit or above. It should enter the fermenting-vats not above 40° to 60° Fahrenheit. By my arrangement it may be reduced to the proper temperature to be delivered to the fermenting-tuns in cold weather, and the temperature of the wort may in warm weather be reduced by my cooler more than 100°, thus effecting even in warm weather a great saving of ice. It is obvious that the exterior portions of the wort trickling through the perforations in the bottom of the receiver G and pan J and over the deflectors I and H will come in contact with the air in the cooling-room. It is also obvious that if comparatively cool air is introduced to the interior of the heated liquid the cooling process will be greatly facilitated, and it is also obvious that if a current is produced to free the cooling-room of the vapors arising from the heated wort the temperature of the air in the cooling-room will be kept at or near the normal temperature of the atmosphere. I have therefore provided means to carry the heated vapors from the cooling-room and to carry with them a current of the cooler or denser atmosphere through the center of the descending column. Thus the descending finely-divided streams and sheets of the liquid are freed from the heated vapors arising from the inside as well as from the outside of the column. If the pipe or chimney $g$ were carried some distance above the top of the building without any exhaust appliances, the natural draft through it would carry off a great portion of the heated vapors; but I find it best to accelerate the natural draft by drawing or siphoning the vapors through the pipe $g$ above the vessel G.

In Fig. 1 I have shown a steam-pipe K, fitted with a vertical nipple $k$, which discharges dry steam through the upper open end of a cone-shaped nipple L, secured within the pipe $g$ by its upturned flange $l$, which forms a trough around the nipple L to receive the water of condensation, which is carried off through the pipe $l'$. This appliance I find sufficient to carry off the vapors from a small or medium-sized cooler; but for a large machine I prefer to interpose in the flue or pipe $g$ an exhaust-blower or power-ventilator, such as shown in Fig. 2, which is the ordinary Sturtevant fan or ventilator. Any other well-known exhaust blower or ventilator may be used in place of the one shown, and any mechanic will know how to make the application when it is understood that it is only necessary to exhaust the air in the cooling-room and to cause the exhaust-current to pass up within the heated column of the descending liquid for the purpose of cooling it.

I do not desire to limit myself to the specific features of construction shown. My invention is in passing streams or sheets of wort (without subjecting it to pressure or vaporizing it) through the atmosphere, providing means by which the atmosphere reaches all sides of the falling liquid, and means to carry off the heated vapors which arise from the process of cooling.

What I claim as new, and desire to secure by Letters Patent, is—

1. The combination, in a beer-cooler, of a collecting-vessel, the stand resting therein, a series of distributers supported by the stand and having central openings, the pipe leading from the boiler and discharging into the upper receiving-distributer, having a central flue whereby the wort is divided into finely-divided streams which descend in a hollow column to the collecting-vessel, and the vapors arising from the interior of said column are carried off through the central flue in the upper receiving-distributer and openings in the deflectors, substantially as shown and described.

2. The combination of the collecting-vessel, the stand consisting of the disk C, flanged rings D E, the feet and rods $c\ d\ e$, the receiving-vessel G at the top of said stand, the deflector H below the said vessel G, the pan J below the said deflector, and the deflector I below the pan J, the said receiving-vessel and pan J having perforated bottoms and central flues H J, substantially as shown and described.

3. The herein-described cooler, consisting of the stand and the removable perforated distributers and deflectors supported thereby, the said deflectors being arranged below the perforated distributers, both deflectors and distributers having central flues, the flaring lower ends of which overhang the tapered upper ends of those below them to provide a central flue to carry off the vapors arising from the liquor between the deflectors and distributers, substantially as shown and described.

HENRY E. DECKEBACH.

Witnesses:
H. K. SHOCKLEY,
A. W. MOHR.